(No Model.)
J. TRAGESER.
SECURING SNUGS OR RINGS ON BOILERS.
No. 262,189. Patented Aug. 1, 1882.
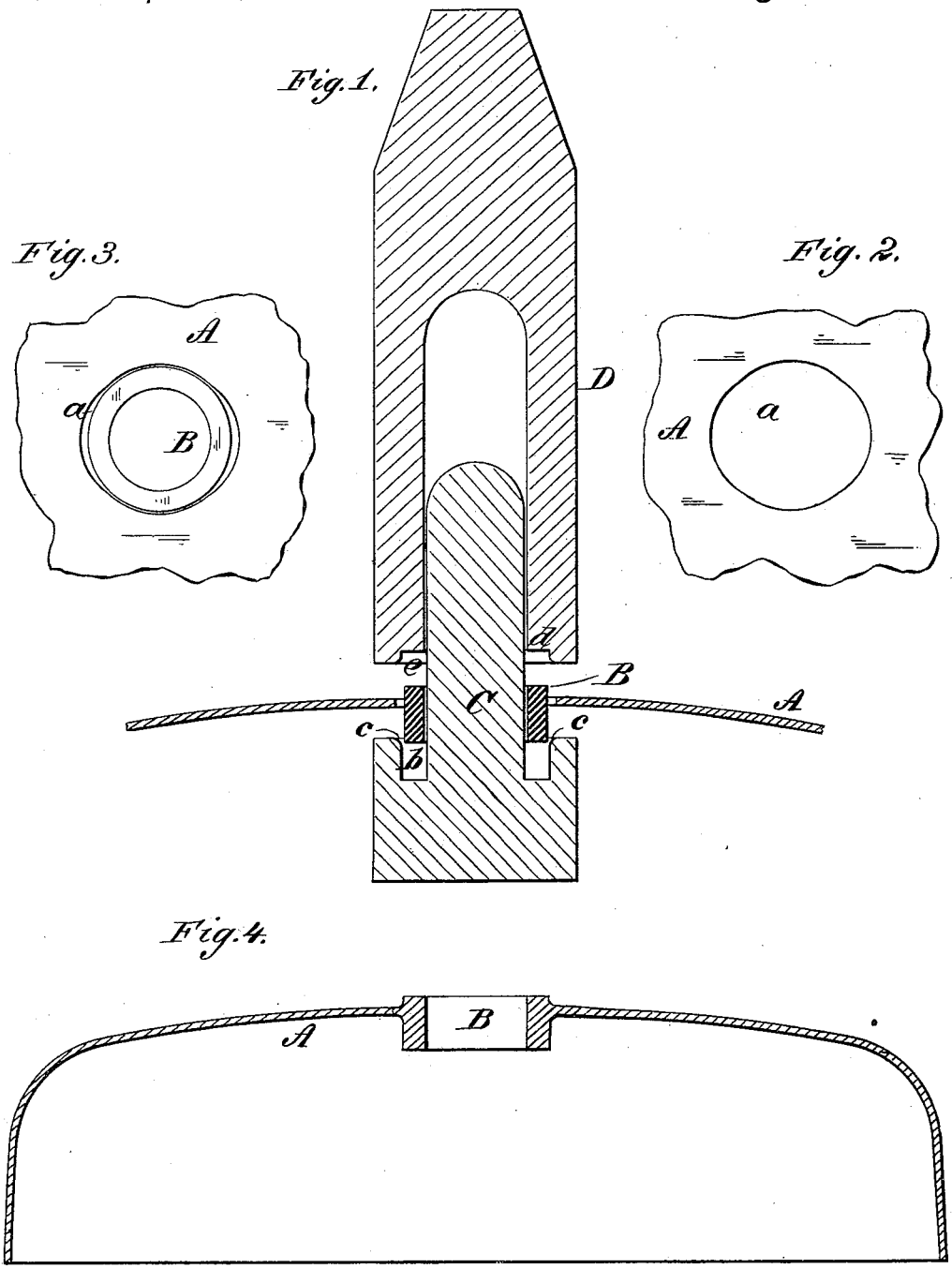
WITNESSES:
Donn Twitchell.
C. Sedgwick
INVENTOR:
J. Trageser
BY Munn & Co.
ATTORNEYS.

UNITED STATES PATENT OFFICE.

JOHN TRAGESER, OF NEW YORK, N. Y.

SECURING SNUGS OR RINGS ON BOILERS.

SPECIFICATION forming part of Letters Patent No. 262,189, dated August 1, 1882.

Application filed April 1, 1882. (No model.)

*To all whom it may concern:*

Be it known that I, JOHN TRAGESER, of the city, county, and State of New York, have invented a new and useful Improvement in Securing Snugs or Rings on Boilers, of which the following is a full, clear, and exact description.

Water-boilers are usually fitted with rings or snugs in their ends or heads for attachment of the pipes. My invention relates to the attachment of these rings or snugs, with the object to provide a quick and inexpensive method of attachment; and it consists in a method of securing the snug or ring in the apertured boiler-head and of a mandrel formed with a groove and beveled edge and a set having a recess and beveled edge, as hereinafter described and claimed.

Reference is to be had to the accompanying drawings, forming a part of this specification, in which similar letters of reference indicate corresponding parts in all the figures.

Figure 1 is a sectional elevation, representing a boiler-head with the ring or snug in place and the compression-dies in position for action. Fig. 2 is a face view of the apertured boiler-head, and Fig. 3 is a similar view with the snug inserted; and Fig. 4 is a sectional side view, showing the snug secured to the head.

A is the boiler-head, formed with an aperture, $a$, which is, for purposes hereinafter set forth, of oval or elliptic form, or otherwise enlarged at one or more points.

B is the ring or snug, of a size for fitting the aperture $a$ closely across the shorter diameter.

C is a mandrel, of a size for passing through the ring snugly, and having its lower end enlarged and formed with an annular groove, $b$, the edge $c$ of which is rounded or beveled.

D is the die or set, formed to pass upon the mandrel C, and formed on its end with a recess, $d$, to pass upon the ring, the edge $e$ of the recess being rounded or beveled.

The operation of securing the ring to the head is as follows: The mandrel C is first put through the boiler-head, and by its enlarged portion supports the head during compression. The ring or snug B is heated and then put upon the mandrel and into the aperture of the head. The set is then brought down with power, and, taking upon the ring, its lower end is forced into the groove $b$, while the recess $d$ on the set passes upon the upper end of the ring, with the effect to upset the ring and by the rounded edges $c\ c$ of the dies to form a rib that unites the ring to the edges of the aperture in the head. The spaces made by the oval form of the hole $a$ are filled out solidly, so that the ring will not be liable to turn when the taps are subsequently applied to cut the screw-thread.

The finished head is shown in Fig. 4, and it is to be observed that the angle between the ring or snug and the head are filled out by the metal upset in the operation, so that the ring is secured and the joint strengthened.

This method can be carried out rapidly and inexpensively.

If desired, the ring can be brazed to the head after being secured as described, for additional security; but I do not limit myself in that respect. The brazing may or may not be done.

Having thus described my invention, I claim as new and desire to secure by Letters Patent—

1. The method or process described of securing snugs or rings in boiler-heads, which consists in enlarging the aperture at certain points in the boiler-head designed to receive the snug or ring, said enlargements extended completely through the thickness of the metal or head, and compressing the ring or snug to cause it to fill said points of enlargement of the aperture by the metal of its external circumference, substantially as shown and described, and for the purpose set forth.

2. The dies for securing rings on boilers, consisting of mandrel C, formed with groove $b$ and beveled edge $c$, and set D, having recess $d$ and beveled edge $e$, substantially as described, combined for use as specified.

JOHN TRAGESER.

Witnesses:
J. H. SCARBOROUGH,
C. SEDGWICK.